Oct. 6, 1953

S. OLDBERG 2,654,530

SUPERCHARGER

Filed Aug. 5, 1949

INVENTOR.
SIDNEY OLDBERG
BY
ATTORNEYS

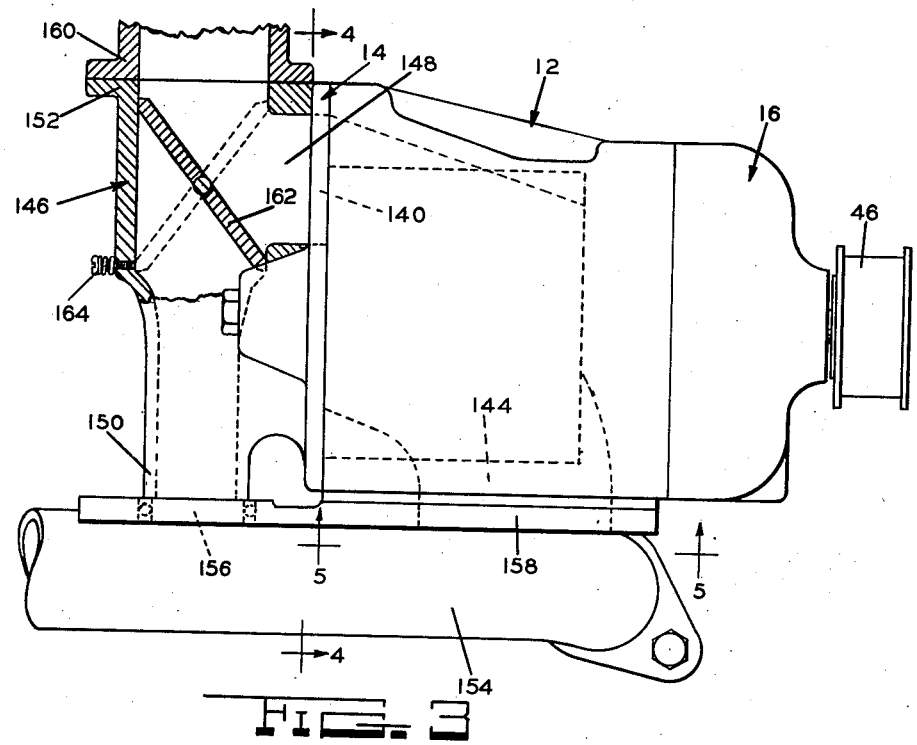
FIG. 3
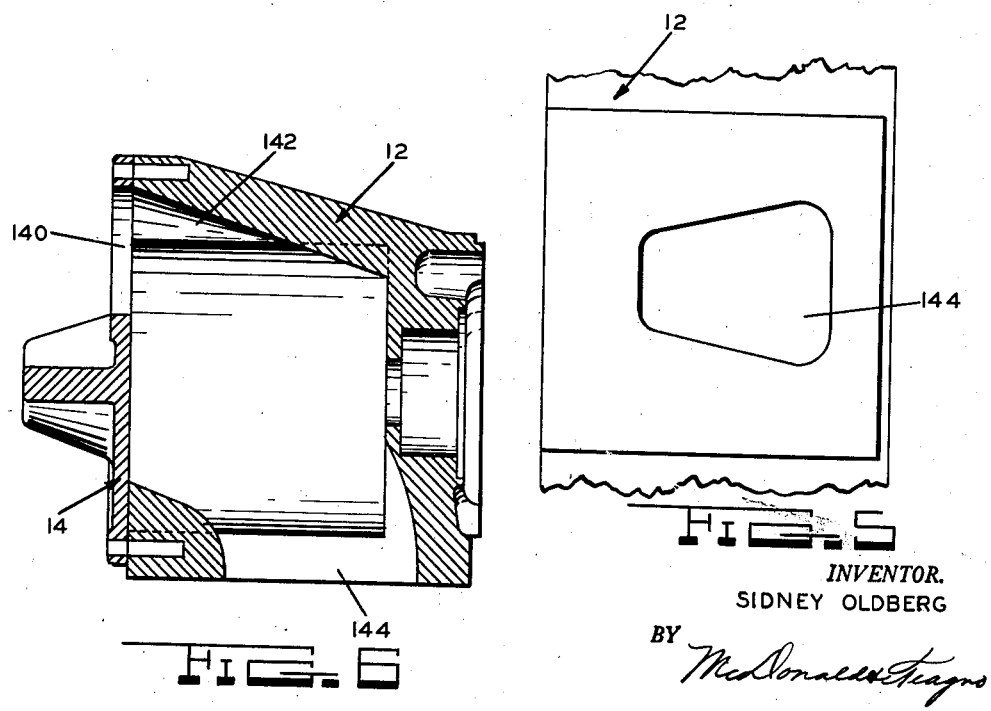
FIG. 6
FIG. 5
INVENTOR.
SIDNEY OLDBERG
BY McDonald & Teagno
ATTORNEYS Oct. 6, 1953     S. OLDBERG     2,654,530
SUPERCHARGER Filed Aug. 5, 1949     4 Sheets-Sheet 4

INVENTOR.
SIDNEY OLDBERG
BY
ATTORNEYS

Patented Oct. 6, 1953

2,654,530

UNITED STATES PATENT OFFICE 2,654,530

SUPERCHARGER

Sidney Oldberg, Birmingham, Mich., assignor to Eaton Manufacturing Company, Cleveland, Ohio, a corporation of Ohio Application August 5, 1949, Serial No. 108,750

4 Claims. (Cl. 230—143)

This invention relates to rotary air impelling devices and more particularly to air impelling devices for use as superchargers for internal combustion engines.

Broadly the invention comprehends the provision of an internal combustion engine supercharger utilizing mating helical rotors and wherein novel structural details are incorporated relative to the disposition of inlet and outlet portions for desirable air flow through the rotors, provision for effective end clearance control of the rotors, provision for the effective lubrication of the bearings of the supercharger, by-pass means for shunting the outlet of the supercharger to the inlet thereof and other innovations of structure permitting of the installation of the supercharger to conventional internal combustion engines with little difficulty and occupying a minimum of space.

An object of the invention is the provision of an air impelling device of economical and compact construction, and light of weight.

Another object of the invention is the provision of a supercharger for internal combustion engines that is high in adiabatic and volumetric efficiency through the improved overall construction thereof relative to rotor form, air flow path provided from inlet to discharge thereof, end clearance control of rotors and proper lubrication of the meshing and bearing elements thereof, all incorporated in a structure of minimum size for a predetermined required capacity.

A further object of the invention is the provision of a supercharger for internal combustion engines having a combustion engine carburetor throttle valve and by-pass valve for the supercharger arranged at the inlet thereto permitting of simultaneous engine throttle control and by-passing air delivered to the engine intake manifold back to the supercharger inlet so as to reduce the work of the supercharger to a minimum under engine throttled conditions, the employment of the combination valve providing for a considerable saving in height in the installation of the supercharger upon the engine.

A yet further object of the invention is the provision of a supercharger having effective end clearance control in the form of a novel spring loaded thrust bearing assembly for the air impeller rotors thereof providing for increased low speed efficiency.

A still further object of the invention is the provision of a supercharger of the displacement type having a combination of endwise and side porting utilized in cooperation with mating helical rotors whereby abrupt changes in the direction of air flow can be avoided, thus resulting in increased adiabatic and volumetric efficiency at high speed operating conditions. This form of porting is additionally helpful in reducing the overall size of the supercharger for installation purposes to internal combustion engines.

A still further object of the invention is the provision of a supercharger that is operable with a minimum of noise through the proper disposition of the inlet and outlet porting to one another and a set of helical rotors employed permitting of substantially free air flow therethrough and the mounting of the drive and driven gears affixed to the respective rotors upon tapered portions of shafts permitting phasing the gears relative to one another and fixed within permissible limits of gear backlash.

Other and further important objects and advantages of this invention will be apparent from the following description taken in connection with the drawings forming a part of the specification and in which:

Fig. 3 is a front plan partially broken away view of the supercharger as installed upon an internal combustion engine;

Fig. 4 is an end plan partially broken away view of the supercharger taken substantially along lines 4—4 of Fig. 3;

Fig. 5 is a fragmentary bottom plan view of the supercharger taken substantially along lines 5—5 of Fig. 3 showing the outlet port thereof;

Fig. 6 is a vertical cross-sectional view of the supercharger taken substantially along lines 6—6 of Fig. 4 illustrating the pumping chamber and relation between the inlet and outlet ports thereof;

Fig. 8 is an enlarged fragmentary view of a thrust washer drive means assembly incorporated in the supercharger of Fig. 1.

Figure 1:
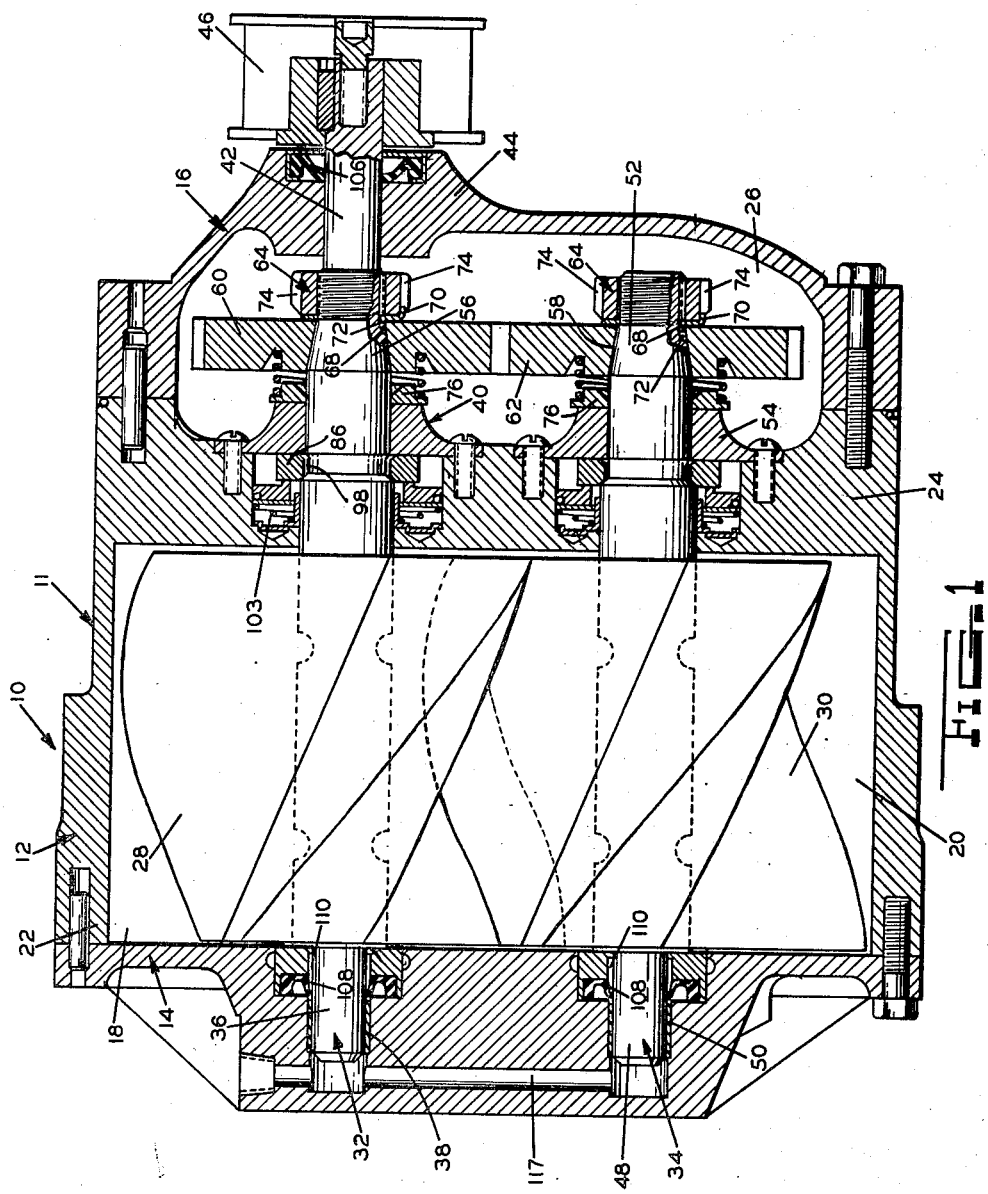
Fig. 1 is a horizontal cross-sectional view of a supercharger, constituting the basis of the invention taken substantially along lines 1—1 of Fig. 4.
Figure 2:
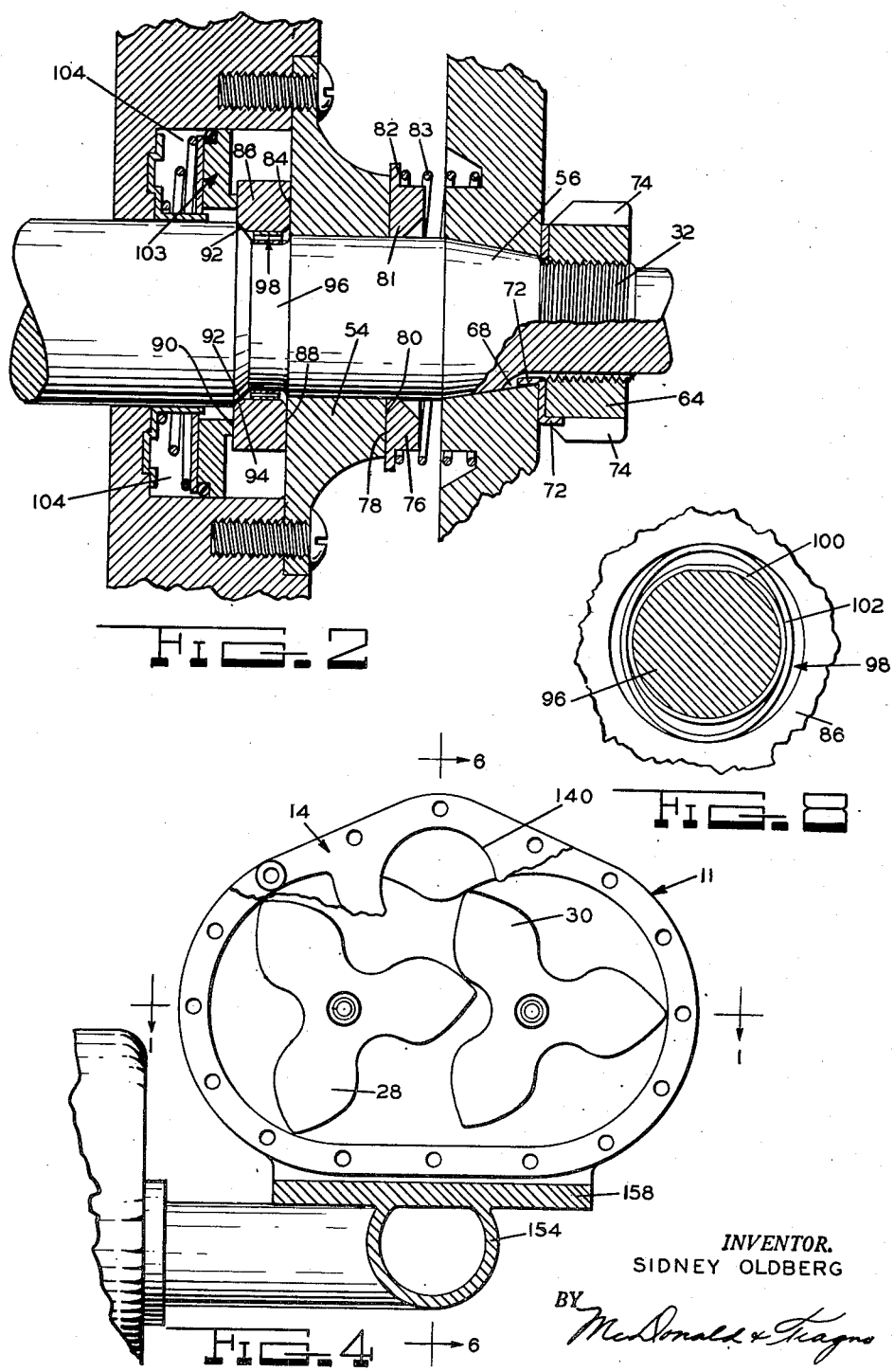
Fig. 2 is an enlarged fragmentary view of the end clearance control means for the rotors and the tapered mounting of drive and driven gears for the supercharger.
Figure 7:
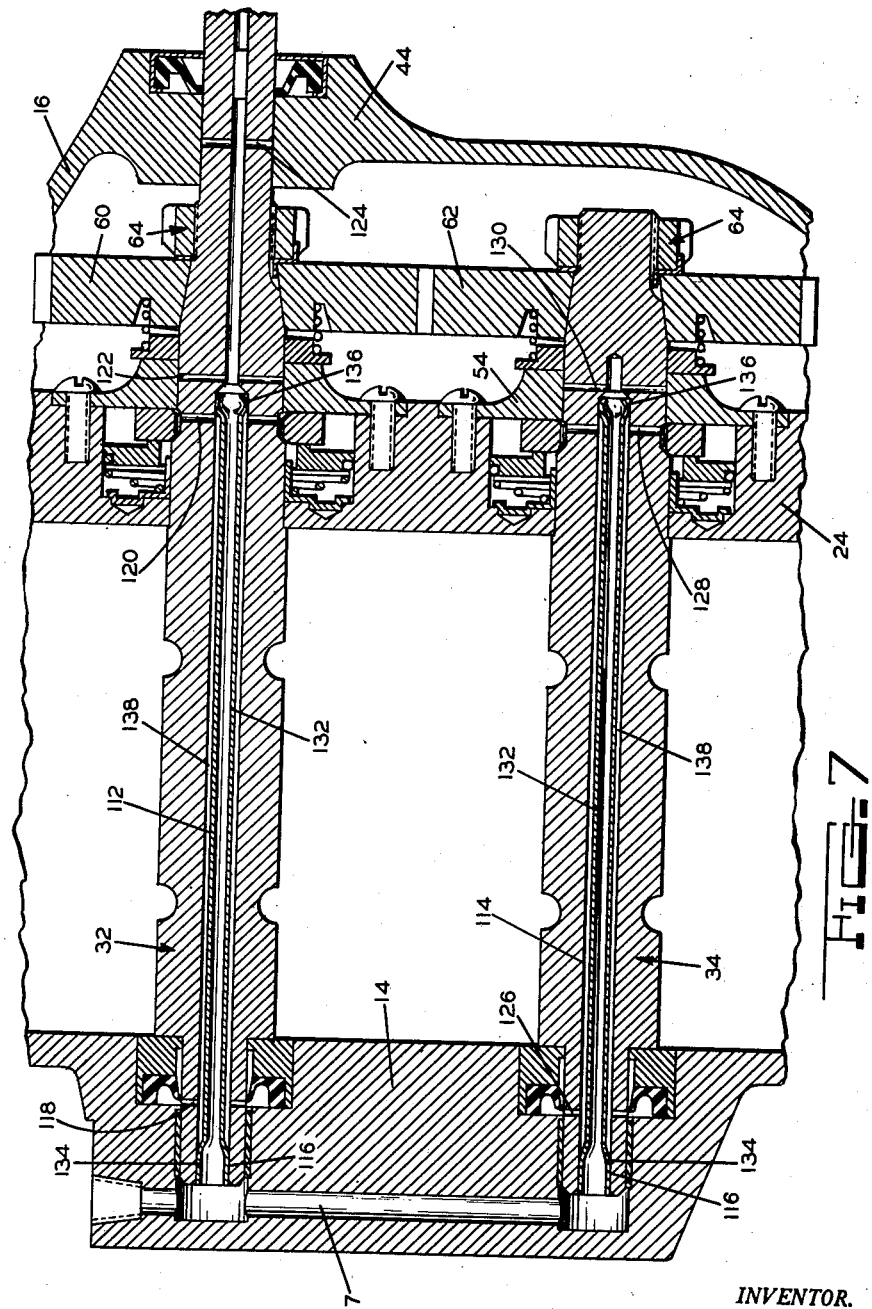
Fig. 7 is an enlarged fragmentary cross-sectional view illustrating the lubrication system for the supercharger.

The presently devised supercharger of the displacement back flow compression type is arrived at providing just such a supercharger having high adiabatic and volumetric efficiencies at all ranges of speed so designed as to be light of weight and compact as to overall dimensions particularly with regard to the height thereof for installation purposes. This supercharger is of the general Roots blower type and constitutes a continuation in part of my co-pending application S. N. 763,633 filed July 25, 1947, now Patent No. 2,530,173.

The present structure in addition to preferably incorporating the construction of my aforementioned application especially with regard to the specific helical interengaging rotors provided includes improvement of structure relative to several inter-related parts thereof. The basic improvements made are those directed to optimum air flow in view of compactness of size desired through the proper disposition of the inlet and outlet ports thereof to one another, end clearance control means in the form of a spring loaded thrust bearing assembly, an effective lubrication system affording ample lubrication for all relatively movable and engageable members, effective mounting of the drive and driven gears for the rotors of the supercharger permitting of proper desired phase relation therebetween and the provision of a combination by-pass and throttling valve.

An optimum air flow is achieved for the compact design here presented by locating the port-pact design here presented by locating the porting in relative endwise and side porting relative to one another, such as to approximately follow a path of flow void of abrupt changes in the direction of flow. This disposition of ports is appropriate considering the twist angle of the helical rotors employed in that it reduces turbulence and cyclic losses thereby improving materially the adiabatic and volumetric efficiency of the supercharger.

By providing an effective and clearance control of the rotors through the use of a suitably designed spring loaded thrust bearing arrangement a very substantial increase in low speed efficiency is obtainable. The use of a spring loaded thrust bearing assembly provides for the accomplishment with simplicity of the self-alignment as well as uniform bearing loading for the support of the rotors in end clearance control. The presently constructed spring loaded thrust bearing comprises the application of a fixed load by means of a flexible member which acts through all the thrust surfaces and which forces a surface rigidly fixed to the rotating shaft of each rotor to bear against a stationary thrust bearing surface.

The lubrication system for the supercharger derives its source of pressure lubricant from the engine to which the supercharger is adapted and provides through an ingenious arrangement of lubricant flow channels for the effective lubrication of all the bearings and relatively rotatable surfaces of the mechanism incorporated in the supercharger aside from the pumping surfaces of the rotors, the pumping chamber of which is sealed from communication with the lubricating system. The desirable and effective distribution of lubricant is accomplished through the incorporation of tubular sleeve members in an axial bore provided in each of the rotor shafts extending axially therethrough permitting of the flow of lubricant internally as well as externally of the tubular sleeves for distribution to a plurality of locations requiring lubrication. In this manner all bearing and moving parts are assured of ample lubrication for all operating speeds of the supercharger.

The drive and driven gears, one associated with each rotor of the supercharger, each have a tapered central bore for receipt of a tapered portion of the shaft upon which they are mounted and are held thereon in predeterminedly fixed position by fastening nuts axially impressing the gears upon their shafts. By so mounting the gears they can be arranged in desired phase relation to one another and fixed within the limits of gear backlash. The tapered mounting permits of an adjustable rotor phasing and is of utmost importance since it determines the amount of backlash or clearance between the rotors, which in turn has an appreciable effect upon the supercharger's efficiency.

Referring to the drawings for more specific details of the invention, 10 represents generally a supercharger or air blower of the displacement type generally adaptable to the supercharging of air for subsequent delivery to the combustion chambers of internal combustion engines or the like comprising a blower housing or case 11 consisting of three major elements, a blower shroud 12, a rear cover plate 14 and a front gear housing 16, said blower shroud 12 and cover plate 14 providing a pair of intercommunicating chambers 18 and 20 therebetween. Whereas the cover plate 14 is suitably secured upon the shroud 12 at its open end 22 the housing 16 is suitably secured upon the opposite axial end of the shroud 12 and forms therebetween with an end wall portion 24 thereof a gear chamber 26.

A pair of identical three lobed rotors 28 and 30 are arranged for air propelling engagement with one another respectively in chambers 18 and 20 and are each cast upon or otherwise suitably secured to appropriate shafts 32 and 34 respectively therefor. The shaft 32 is journaled at one end 36 upon a sleeve bushing 38 mounted in cover plate 14, intermediate its length upon a combination stationary thrust and radial bearing 40 fixedly secured upon end wall portion 24 of shroud 12 and near its other end 42 in hub section 44 of housing 16. The extremity of end 42 of shaft 32 extends beyond the hub section 44 of housing 16 and is adapted to have a sheave or pulley 46 splined thereto, said pulley in turn being adapted to be driven by a belt, not shown, driven from an engine with which the supercharger is to be associated.

The shaft 32 in being driven from its associated engine is designated the driving or input shaft of the supercharger whereas shaft 34 is designated the driven shaft, said shaft 34 being mounted for rotation similarly to shaft 32 in that it is supported at one end 48 in a sleeve bushing 50 mounted in cover plate 14 and near its other end 52 upon a combination stationary thrust and radial bearing 54. The bushing 50 and bearing 54 are identical respectively to the bushing 38 and bearing 40 associated with shaft 32, the purpose of bearings 40 and 54 of which will hereinafter further appear.

The shafts 32 and 34 are each provided with tapered portions 56 and 58 respectively located in close proximity to the journaled portions thereof on the respective bearings 40 and 54. The tapered portions of the shafts are each adapted to have drive and driven gears 60 and 62 respectively mounted thereon for meshing engagement with one another, secured in predetermined proper phased relation providing for the desired rotor backlash or clearance therebetween by fastening nut 64 threaded upon the respective shafts 32 and 34. The nut 64 serves in axial threaded relation upon its respective shafts to fixedly secure the gears upon the shafts resisting movement relative thereto and the nuts are held from rotative motion relative to their shafts by clinch washer 66 having axial ears 68 and 70 extending in a direction opposite to one another when in assembled form for appropriate receipt in slots of the shafts and nut. The shafts 32 and 34 are each provided with a slot 72 for receipt of ear 68 of washer 66 and the nuts have a plurality of axial grooves or slots 74 circumferentially spaced on the exterial surface of the nut for receipt of the ear 70 of the washer in the slot juxtaposed the ear when the nut is screwed up tight, said ears 70 being bent axially therein only after the nut is tightened.

The gears 60 and 62 in their mounted relation to one another upon shafts 32 and 34 are engageable for meshing rotation in gear chamber 26 as induced for motion for power delivered to shaft 32 through pulley 46.

A front thrust washer 76 is provided for assembly intermediate the gears 60 and 62 and their respective associated bearings 40 and 54 having one face 78 thereof in planar axial contacting relation upon the front face 80 of the bearings 40 and 54 with which associated. The washers 76 are each reduced in axial width at their inner diameter 81 so as to afford radial control thereof by limited contact with the external surface of their associated shaft and have a shoulder portion 82 for axial receipt and impingement of a coil spring 83 disposed between the respective gear and washer for loading the thrust surface 78 of the washer upon the thrust receiving surface of the bearings and for rotatively driving the thrust washer.

The bearings 40 and 54 each have arranged in thrust bearing relation on faces 84 thereof axially oppositely disposed from faces 80 a rear thrust washer 86 which bears axially thereon. The thrust washers 86 are ring shaped having a pair of oppositely disposed planar surfaces 88 and 90 respectively, surfaces 88 of which engage the bearing faces 84, and an internal circular surface radius chamfer at one axial end in annular line contacting relation thereof 92 the chamfered edge 92 of which are adapted to bear on a straight chamfered shoulder 94, one of which is formed on each of the shafts 32 and 34. The shafts 32 and 34 each have portions 96 thereof radially inwardly located of the internal diameter of the thrust washer with annular clearance therebetween and a drive spring assembly 98 is interposed in the annular clearance between the shafts 32 and 34 and their respective washers 86. Whereas the bearings 40 and 54 establish the plane of rotation of the respective washers 86 associated therewith the cooperating chamfers 92 and 94 of the respective washers and shafts fix the radial and axial positions of the washers while the spring assembly 98 provides a driving connection between the shafts and washers. Through the provision of the line contacting relation of the washer chamfer 92 on chamfered shoulder 94 of the shaft with which it is associated a proper radial and axial position of the washer is assured without the necessity of maintaining finite tolerance of the associate elements.

The washer spring drive means 98 comprises a ring member 100 having a flat portion 102 fitted appropriately on a complementary external surface of portion 96 of the shafts 32 and 34 for the stationary retention thereof and an elliptical shaped spring member 102 fixed at diametrically opposite points by welding or the like to ring member 100 at its narrow width and with its maximum width points in resilient engaging relation upon the inner wall of the thrust washer for frictional engagement therewith. This arrangement provides an effective washer driving means for the proper maintenance of alignment radially and axially and balance in the torsional rotation thereof.

The face 90 of each thrust axial spring pressed washer has sealing engagement with seal assemblies 103 fixedly arranged in annular openings 104 formed in the end wall portion 24 of shroud 12 in surrounding relation to the shafts 32 and 34 respectively.

The hub section of housing 16 has arranged thereon in encompasing relation to end 42 of shaft 32 a sealing member 106, said sealing member effective to inhibt the leakage of lubricant delivered to the gear chamber 26.

The seal assemblies 102 in cooperation with thrust washers prevent the leakage of lubricant from the gear chamber into the pumping chambers of the supercharger and simultaneously effect a sealing of the supercharger for the leakage of air therefrom.

The shafts 32 and 34 at their ends adjacent the sleeve bushings 38 and 50 respectively are each engaged by fluid seals 108 mounted in annular openings 110 formed in the end cover plate 14, said seals inhibiting the leakage of lubricant into the pumping chambers of the supercharger.

The shafts 32 and 34 are each provided with axial bores 112 and 114 respectively extending therethrough a predetermined distance the open end 116 of each bore communicating by way of passageway 117 in cover plate 14 with a lubricant supply, not shown. The bore 112 in shaft 32 communicates with groups of axially spaced radial holes 118, 120, 122 and 124 for the appropriate distribution of lubricant respectively to the sleeve bushing 38, thrust washer 86, bearings 40 and 54 and hub journal 42. The bearings 40 and 54 are each slotted in their oppositely disposed faces to permit of the flow of lubricant therebetween with the thrust washers bearing thereon. Each group of holes 118, 120, 122 and 124 comprises a plurality of circumferentially spaced holes extending from the bore 112 radially outwardly to the external surface thereof for the conveyance of fluid lubricant therethrough.

The bore 114 in shaft 34 has similar communication to bore 112 in shaft 32 with groups of axially spaced holes 126, 128 and 130 providing for the conveyance of fluid lubricant to the respective sleeve bushing 50, washer 86 and bearing 54 associated therewith. The group of holes 126, 128 and 130 each comprises a plurality of circumferentially spaced radial extending holes.

As a positive means of insuring the delivery of lubricant to the many parts of the supercharger requiring lubrication each of the bores 112 and 114 have inserted therein a tubular sleeve 132 having enlarged portions 134 and 136 at their opposite ends adapted to fit the bore with a tight fit providing when in assembly an annular channel 138 with the wall of the bores for the passage of lubricant therein.

The sleeves 132 serve to provide internally thereof a direct passageway for the supply of lubricant therethrough from passageway 117 to holes 122 and 124 in the case of shaft 32 and to holes 130 in the case of shaft 34.

The lubricant delivered to passageway 117 in addition to passing into sleeves 132 is fed around sleeve bushings 38 and 50 and thence through holes 118, channel 138 and holes 120 to washer 86 associated with shaft 32 and through holes 126, channel 138 and holes 128 associated with shaft 34.

Through the press fit of the sleeves 132 in the respective bores 112 and 114 the high pressure oil is positively separated from the low pressure oil wherein channels 138 constitute low pressure oil passages and the passages internally of the sleeves constitute high pressure oil passages such that the thrust surfaces of washers 86 receive overflow oil from bearings 40 and 54 respectively and overflow oil from the sleeve bearings 38 and 50 respectively with the overflow therefrom delivered into the gear housing.

The porting for the supercharger includes an inlet port 140 in cover plate 14 communicating intermediate the chambers 18 and 20 by way of angular channel passage 142 disposed for the delivery of fluid into the chambers between the rotors 28 and 30 and an outlet port 144 of trapezoidal shape arranged in the bottom of blower shroud 12 communicating with the chambers 18 and 20 intermediate thereof, the purpose of which will hereinafter appear.

The ports 140 and 144 are disposed at right angles to one another for the purpose of providing porting which lies approximately in a plane parallel to the direction of air flow of the supercharger due to the twist of the rotors impelling the air in such a directional path, and in this way substantially prevents turbulence losses, cyclic losses and minimize leakage losses. By controlling these losses to a minmum increased adiabatic and volumetric efficiencies under high speed operating conditions are otbained.

For the purpose of eliminating work of the supercharger under throttling conditions of an engine to which it is applied, a by-pass housing 146 is mounted upon the cover plate 14 of the supercharger having a ported connection 148 communicating with the inlet porting 140 of the supercharger, a ported connection 150 and a ported connection 152. The ported connection 150 is arranged for communication with an engine manifold 154 by way of port 156 therein, and the manifold in turn has communication by way of port 158 therein with the outlet port 144 thereby establishing a path of communication between supercharger chambers 18 and 20 through port 144, port 158, manifold 154, port 156, port 150 through by-pass housing 146 and with ports 148 and 152 respectively with the inlet 140 of the supercharger and with a carburetor 160 arranged in communication with port 152 mounted upon the by-pass housing 146.

The communication of port 150 for air delivery through the by-pass housing to the respective ports 148 and 150 is controlled by a dual purpose throttle and by-pass valve 162 adapted for pivotal adjustment at the junction of ports 148, 150 and 152 therein as shown by full lines full capacity delivery to the supercharger is had and when in dotted line position the supercharger does appreciably no work in that under this condition it is only necessary to force the by-pass air through the by-pass duct. The dotted line position of valve 162 represents throttled position for the engine to which the supercharger is applied wherein the manifold pressure is to be atmospheric or less and wherein it is necessary to provide idle jet 164 permitting of the throttled condition of operation of the engine.

The positioning of the porting 140 and 144 of the supercharger with respect to blower shroud 12 thereof permits of the installation assembly of the by-pass housing T connection between the carburetor and manifold in communication with the supercharger, thereby effecting a saving in height in installation, elimination of extra piping and an extra valve over conventional forms of supercharger installations.

Although the drawings and specifications define a supercharger of specific design and applications, it is conceivable that various departures in structure can be made therefrom without materially altering the basic concepts thereof and accordingly the invention is limited only to the extent of the appended claims drawn in terms of the basic ideas disclosed.

What I claim is:

1. A rotary blower comprising a blower housing having axially opposite end walls, a pair of intercommunicating chambers and inlet and discharge ports arranged intermediate the chambers, one of said end walls having a pair of spaced openings therethrough, a pair of stationary bearings secured to the said wall of the housing having the spaced openings therethrough, each of said bearings being in concentric relation to one of the spaced openings, a pair of rotors, one in each chamber, mounted for interengaging rotative relation in a zone between the chambers, a pair of shafts, one for each rotor, journalled at one end in one end wall of the blower housing and each including portions extending axially beyond the other end wall of the housing, journalled in one of the stationary bearings, a pair of intermeshing gears, one affixed to the portion of each shaft extending beyond said one end wall of the housing, and a spring loaded thrust bearing assembly for each rotor arranged on each shaft adjacent the said one end of the housing having the portions of the shafts extending therebeyond comprising a washer bearing axially upon one axial extremity of its associated bearing, a spring axially interposed between the washer and its associated gear and a second washer disposed on the opposite side of its associated bearing, from the first washer, axially interposed between a portion of its associated shaft and stationary bearing in axial bearing relation thereto.

2. A rotary blower comprising a blower housing having axially opposite end walls, a pair of intercommunicating chambers and inlet and discharge ports arranged intermediate the chambers, one of said end walls having a pair of spaced openings therethrough, a pair of stationary bearings secured to the said wall of the housing having the spaced openings therethrough, each of said bearings being in concentric relation to one of the spaced openings, a pair of rotors, one in each chamber, mounted for interengaging rotative relation in a zone between the chambers, a pair of shafts, one for each rotor, journalled at one end in one end wall of the blower housing and each including portions extending axially beyond the other end wall of the housing, journalled in one of the stationary bearings, each including a reduced portion on one extremity, said reduced portion providing an annular shoulder adjacent the end wall of the housing having the spaced openings therethrough, a pair of intermeshing gears, one affixed to the portion of each shaft extending beyond said one end wall of the housing, and a spring loaded thrust bearing assembly for each rotor arranged on each shaft adjacent the said one end of the housing having the portions of the shafts extending therebeyond comprising a washer bearing axially upon one axial extremity of its associated bearing, a spring axially interposed between the washer and its associated gear and a second washer disposed on the opposite side of its associated bearing, from the first washer, axially interposed between the shoulder on its associated shaft and stationary bearing in axial bearing relation thereto.

3. A blower according to claim 2 wherein the second washer is resiliently mounted on its associated shaft and rotative therewith.

4. A blower according to claim 2 wherein a spring member is inserted radially intermediate the second washer and its associated shaft and has a portion fixedly secured to the second washer and another portion fixedly secured to the associated shaft.

SIDNEY OLDBERG.

References Cited in the file of this patent

UNITED STATES PATENTS

| Number | Name | Date |
|---|---|---|
| 612,304 | Blazer | Oct. 11, 1898 |
| 1,542,614 | Ellis | June 16, 1925 |
| 2,014,932 | Hallett | Sept. 17, 1935 |
| 2,147,405 | Horton | Feb. 14, 1939 |
| 2,243,874 | Lysholm | June 3, 1941 |
| 2,287,716 | Whitfield | June 23, 1942 |
| 2,358,815 | Lysholm | Sept. 26, 1944 |
| 2,477,002 | Paget | July 26, 1949 |
| 2,477,004 | Paget | July 26, 1949 |
| 2,519,913 | Lysholm | Aug. 22, 1950 |

FOREIGN PATENTS

| Number | Country | Date |
|---|---|---|
| 384,355 | Great Britain | Dec. 8, 1932 |
| 464,493 | Great Britain | Apr. 16, 1937 |